(12) United States Patent
Yagyu et al.

(10) Patent No.: US 7,369,326 B2
(45) Date of Patent: May 6, 2008

(54) IMAGING OPTICAL SYSTEM AND IMAGE PICKUP APPARATUS

(75) Inventors: Genta Yagyu, Nishinomiya (JP); Tetsuo Kohno, Suita (JP); Shinji Yamaguchi, Osaka (JP)

(73) Assignee: Konica Minolta Photot Imaging, Inc., Tokyo (JP)

( * ) Notice: Subject to any disclaimer, the term of this patent is extended or adjusted under 35 U.S.C. 154(b) by 0 days.

(21) Appl. No.: 11/593,357

(22) Filed: Nov. 6, 2006

(65) Prior Publication Data

US 2007/0109664 A1 May 17, 2007

(30) Foreign Application Priority Data

Nov. 15, 2005 (JP) .............................. 2005-329960

(51) Int. Cl.
G02B 15/14 (2006.01)
H04N 5/262 (2006.01)
(52) U.S. Cl. .................... 359/689; 348/240.3
(58) Field of Classification Search ............ 348/240.3, 348/240.99; 359/683, 689, 690
See application file for complete search history.

(56) References Cited

U.S. PATENT DOCUMENTS 6,104,432 A    8/2000  Nakamura et al. .......... 348/360
7,145,730 B2* 12/2006 Mihara ..................... 359/686
7,154,680 B2* 12/2006 Satori et al. ............... 359/687
7,177,094 B2*  2/2007 Mihara et al. ............. 359/686
7,248,293 B2*  7/2007 Iwasawa ................... 348/240.3
2007/0279743 A1* 12/2007 Kushida .................... 359/557

FOREIGN PATENT DOCUMENTS

| JP | 9-138347 A    | 5/1997 |
| JP | 2000-131610 A | 5/2000 |
| JP | 2002-169088 A | 6/2002 |
| JP | 2004-102089 A | 4/2004 |

* cited by examiner

Primary Examiner—David N. Spector
(74) Attorney, Agent, or Firm—Sidley Austin LLP

(57) ABSTRACT

A compact bent zooming imaging optical system characterized by sufficient aberration correction. The imagining optical system contains, in order from the object, a first lens group having positive refractive power, a second lens group with negative power which has a reflective optical element for bending the optical axis and lenses on each of the object side and the image side of the reflective optical element, and a following lens group. At least the aforementioned first lens group and following lens group are moved to change in the magnification. $-0.6<\phi1/\phi2<-0.15$ is satisfied wherein $\phi1$ denotes the refractive power of the first lens group and $\phi2$ indicates the refractive power of the second lens group.

18 Claims, 11 Drawing Sheets

FIG. 9 ( a )
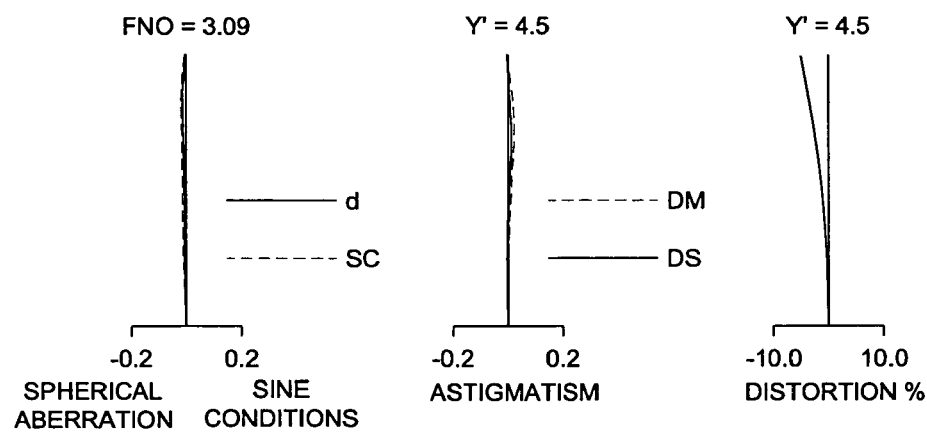
FIG. 9 ( b )
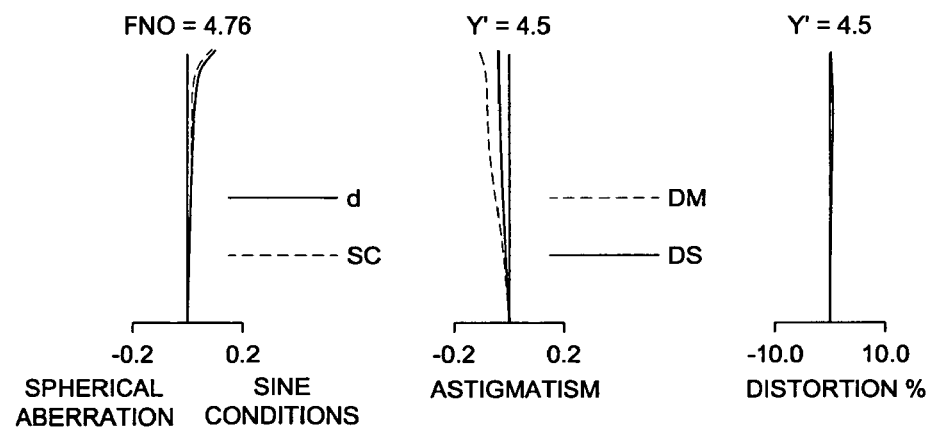
FIG. 9 ( c )
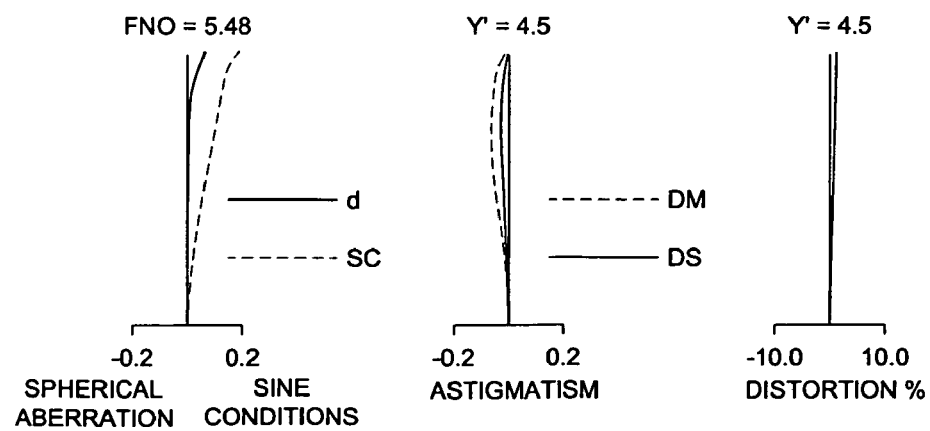

IMAGING OPTICAL SYSTEM AND IMAGE PICKUP APPARATUS

This application is based on Japanese Patent Application No. 2005-329960 filed on Nov. 15, 2005, in Japanese Patent Office, the entire content of which is hereby incorporated by reference.

TECHNICAL FIELD

The present invention relates to an imaging optical system and an imaging apparatus, particularly to a bent imaging optical system wherein imaging magnification is variable.

BACKGROUND

With the spread of personal computers in recent years, digital cameras capable of capturing an image easily into the personal computer have come into widespread use. Further, it has become a common practice to incorporate a digital camera into an information processing apparatus such as a mobile computer, cellular phone and PDA (Personal Digital Assistant). The widespread use of such digital cameras calls for more compact digital cameras. Thus, further downsizing of an imaging optical system is an essential technique to keep up with the trend.

To downsize the imaging optical system, the Japanese Laid-Open Patent Publication No. 2000-131610 discloses a proposal wherein a reflective optical element such as a prism or reflective mirror is arranged at some midpoint along the optical path of the imaging optical system to bend the optical path, whereby the size of the imaging optical system can be reduced without changing the length of the optical path even during zooming. To meet the requirements for higher zoom ratio in the bent imaging optical system, the Japanese Laid-Open Patent Publication No. 1997-138347 proposes a zoom lens characterized by the zoom ratio of six or more. Since the first lens group is provided with a reflective optical element, the size of the reflective optical element is increased against the demand for more compact imaging optical system.

The Japanese Laid-Open Patent Publication No. 2002-169088 and Japanese Laid-Open Patent Publication No. 2004-102089 disclose the imaging optical system wherein the reflective optical element is installed closer to the image surface than the first lens group, thereby reducing the size further.

In the optical system described in the Laid-Open Patent Publication No. 2002-169088, however, a reflective optical element is provided between the second lens group and third lens group. Since many lens are arranged on the object side of the reflective optical element, this method fails to achieve downsizing the size in the direction of the depth of the digital camera.

In the optical system described in the Japanese Laid-Open Patent Publication No. 2004-102089, a reflective optical element is arranged in the second lens group, thereby reducing the size of the digital camera along the depth. However, the thickness from the reflective optical element to the most object side surface of the optical system is not yet reduced. The target of downsizing cannot be said to have been achieved.

SUMMARY

The object of the present invention is to solve the aforementioned problems and to provide an imaging optical system characterized by compact configuration despite a higher zoom ratio, and satisfactory correction of aberration.

In view of forgoing, one embodiment according to one aspect of the present invention is an imaging optical system for imaging light from an object side on an image pickup device, comprising:
 a first lens group with positive power on an object side;
 a reflective optical element on an image side of the first lens group, for bending an optical axis substantially perpendicularly;
 a second lens group with negative power which includes a lens on the object side of the reflective optical element and a lens on the image side of the reflective optical element; and
 a following lens group on the image side of the second lens group,
 wherein the imaging optical system is a zoom lens, and power φ1 of the first lens group and power φ2 of the second lens group satisfy the following relationship:

$$-0.6 < \phi1/\phi2 < -0.15$$

According to another aspect of the present invention, another embodiment is an image pickup apparatus, comprising:
 an image pickup device for converting incident light into an electric signal; and
 an imaging optical system for imaging light from an object side on the image pickup device, the imaging optical system including:
 a first lens group with positive power on an object side;
 a reflective optical element on an image side of the first lens group, for bending an optical axis substantially perpendicularly;
 a second lens group with negative power which includes a lens on the object side of the reflective optical element and a lens on the image side of the reflective optical element; and
 a following lens group on the image side of the second lens group,
 wherein the imaging optical system is a zoom lens, and power φ1 of the first lens group and power φ2 of the second lens group satisfy the following relationship:

$$-0.6 < \phi1/\phi2 < -0.15$$

BRIEF DESCRIPTION OF THE DRAWINGS

FIG. 9(a) is a diagram showing the aberration at the wide angle end of the imaging optical system of the digital camera of the first embodiment;

FIG. 9(b) is a diagram showing the aberration at the intermediate focal length of the imaging optical system of the digital camera of the first embodiment;

FIG. 9(c) is a diagram showing the aberration at the telephoto end of the imaging optical system of the digital camera of the first embodiment;

DETAILED DESCRIPTION OF THE PREFERRED EMBODIMENT

Figure 1A:
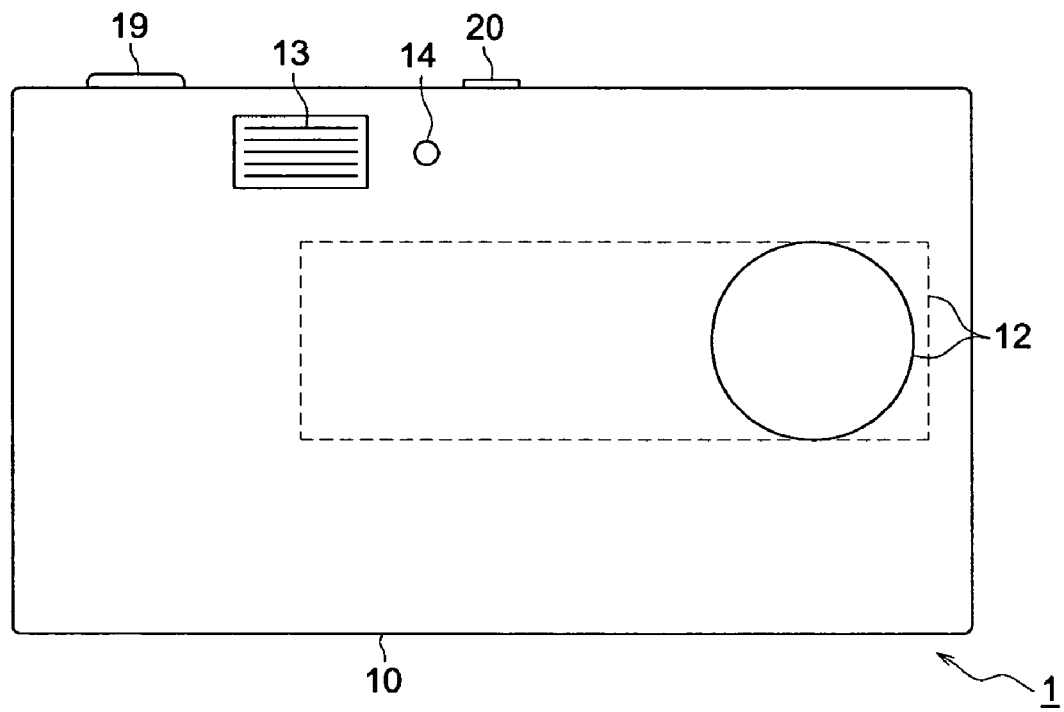
FIG. 1(a) is a front view schematically showing the external appearance of the digital camera of each embodiment.
Figure 1B:
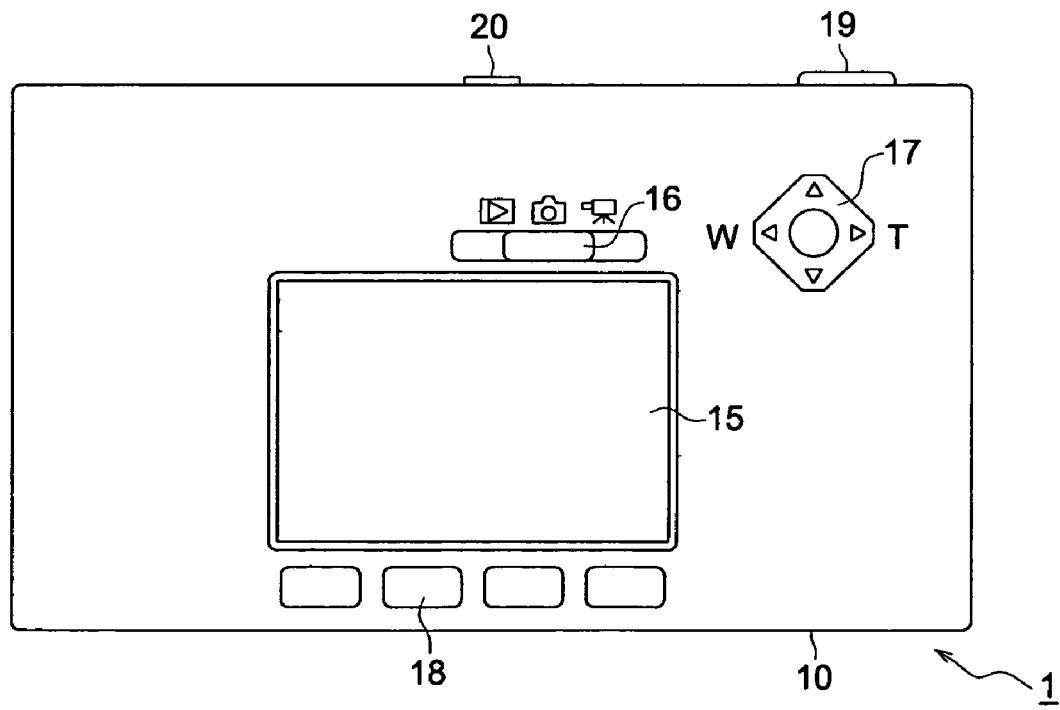
FIG. 1(b) is a rear view schematically showing the external appearance of the digital camera of each embodiment.

Referring to the drawings, the following describes the embodiments of the present invention. While the preferred embodiments of the present invention have been described using specific terms, such description is for illustrative purpose only, and it is to be understood that changes and variations may be made without departing from the spirit or scope of the appended claims. FIG. 1 schematically shows the external appearance of the digital camera as an embodiment of the present invention. FIG. 1(a) is a front view, while FIG. 1(b) is a rear view.

The digital camera 1 has a casing 10 of approximately rectangular parallelepiped form. It is assumed in the normal imaging mode that the direction of the shortest side of the casing 10, i.e., the direction perpendicular to the sheet surface of FIG. 1 is a depth direction; the right/left direction of FIG. 1 is a lateral direction; and the up/down direction of FIG. 1 is a vertical direction.

The digital camera 1 has an imaging optical system 12, flash emitting section 13 and self-timer lamp 14 on the front surface, and a display section 15, mode setup switch 16, cross button 17 and a plurality of operation keys 18 on the rear surface. A shutter start button 19 and a power button 20 are provided on the top surface.

Part of the imaging optical system 12 protrudes from the front surface of the casing 10, and remaining lens section is arranged inside the casing 10, as shown by the dotted line of FIG. 1(a). The flash emitting section 13 is a flash light to illuminate the object to be imaged. The self-timer lamp 14 lights up to indicate that the preparation of the self-timer imaging mode is in the process.

The display section 15 is made up of a liquid crystal display unit and indicates the captured image as well as such information as the setup state of the digital camera 1 and operation guide. The mode setup switch 16 is a slide switch, and is used to set the operation mode of the digital camera 1.

The cross button 17 has four contacts on the top, bottom, right and left, and is used to move the cursor indicated on the display section 15. The imaging optical system 12 has a zoom lens, and the cross button 17 is used to adjust the focal length as well. The operation button 18 is used to set up the function of the digital camera 1 such as switching of the items indicated on the display section 15, and selection of the indicated items. The shutter start button 19 operates in two steps and is used to instruct the preparation for the capturing of the image to be recorded, and to instruct capturing of the image to be recorded.

Figure 2:
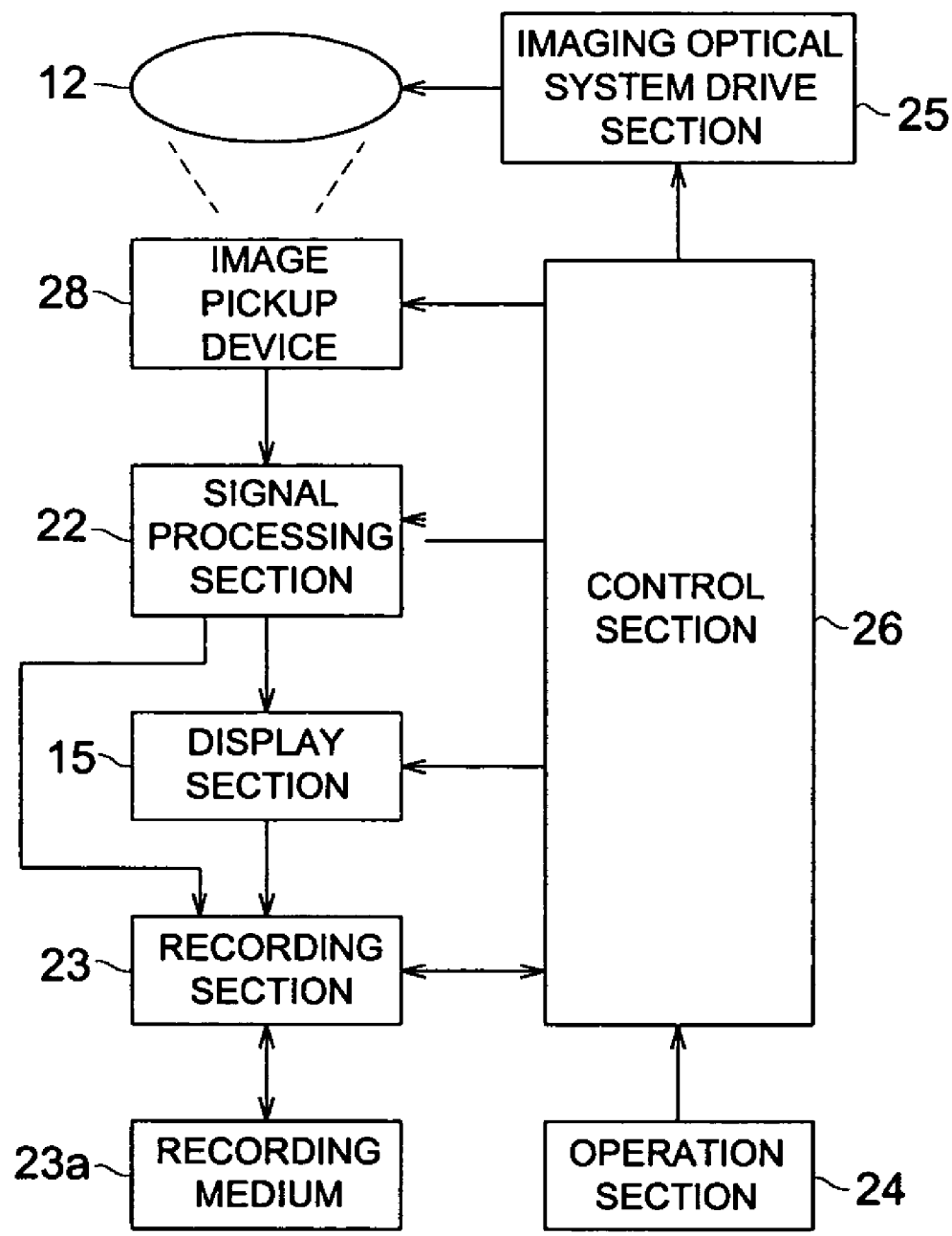
FIG. 2 is a diagram schematically showing the structure of the digital camera of each embodiment.

FIG. 2 schematically shows the structure of the digital camera 1. The digital camera 1 contains an image pickup device 28, signal processing section 22, recording section 23, operation section 24, imaging optical system drive section 25 and control section 26 in addition to the imaging optical system 12 and display section 15. The image pickup device 28 is a CCD area sensor and outputs the signal representing the amount of light received for each pixel. The signal processing section 22 processes the output signal of the image pickup device 28, and generates the image data representing the captured image. The recording section 23 records the image data generated by the signal processing section 22 on the detachable recording medium 23a. For image reproduction and display, the image data is read from recording medium 23a. The operation section 24 is a generic term for the aforementioned buttons 16 through 20. The signal on the user operations is transmitted to the control section 26 by this operation section.

The imaging optical system drive section 25 has a transmission mechanism to transmit the drive force of some motors to the lens groups of the imaging optical system 12. It is used to set up the focal length and focal position of the imaging optical system 12. The control section 26 controls each section in response to the instruction given through the operation section 24.

The following describes the structure of the imaging optical system 12. FIGS. 3 through 6 indicate the infinite focused state in the wide angle end focal length of the imaging optical system of the first through fourth embodiments of the present invention. The arrow mark indicates the positions of the lens groups G1 through G4 during zooming. The base end of the arrow mark corresponds to the wide angle end (W) and the head of the arrow corresponds to the telephoto end (T). No arrow mark is used to indicate the lens group which is stationary with respect to the image surface during zooming. In FIGS. 3 through 6, the state of being incorporated in the digital camera 1 is developed on the plane surface. The prism is indicated by a parallel flat plate, and the mirror by air gap. The optical axis is denoted by a straight line.

Figure 3:
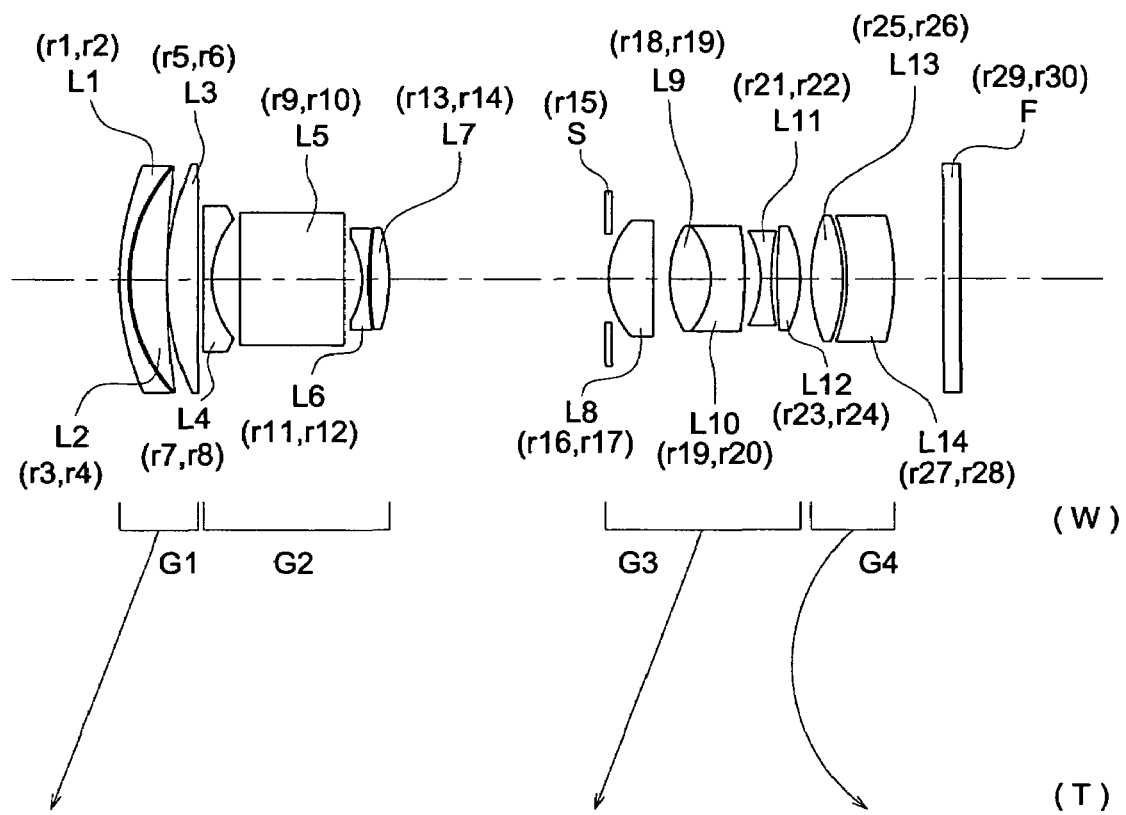
FIG. 3 is a diagram showing the structure of an imaging optical system of the digital camera as a first embodiment.

The first embodiment is given in FIG. 3. The imaging optical system of FIG. 3 contains a first lens group G1 having positive refractive power, a second lens group G2 having negative refractive power, aperture stop S and as following lens groups, a third lens group G3 having positive refractive power and a fourth lens group G4 having positive refractive power. These components are given in that order from the object. A parallel flat plate F which is equivalent to a low pass filter and a cover glass lies on the image surface side of the imaging optical system.

The first lens group G1 is made up of a negative meniscus lens L1 with the convex side facing the object side, a positive meniscus lens L2 with the convex side facing the object side, and a positive meniscus lens L3 with the convex side facing the object. They are arranged in that order from the object side.

The second lens group G2 is formed of a biconcave negative lens L4 wherein the surface on the image side forms an aspherical surface, a rectangular prism L5 that can be expressed by a parallel flat plate on the chart, a biconcave negative lens L6, and a biconvex positive lens L7. They are arranged in that order from the object side.

The third lens group G3 contains a positive meniscus lens L8 with the concave surface facing the object side, a biconvex positive lens L9, a negative meniscus lens L10 cemented to the lens L9 with convex surface facing the image side, a biconcave negative lens L11 wherein the image surface side forms an aspherical surface, and a biconvex positive lens L12. They are arranged in that order from the object side.

The fourth lens group includes a biconvex positive lens L13 wherein both surfaces are aspherical, and a negative meniscus lens L14 with the concave surface facing the object side. They are arranged in that order from the object side.

During zooming from the wide angle end to the telephoto end, the first lens group G1 moves toward the object side. The second lens group G2 is stationary with respect to the image side. The third lens group G3 moves toward the object side. The fourth lens group G4 first moves toward the object side, and travels toward the image side between around the intermediate focal length and the telephoto end.

Figure 4:
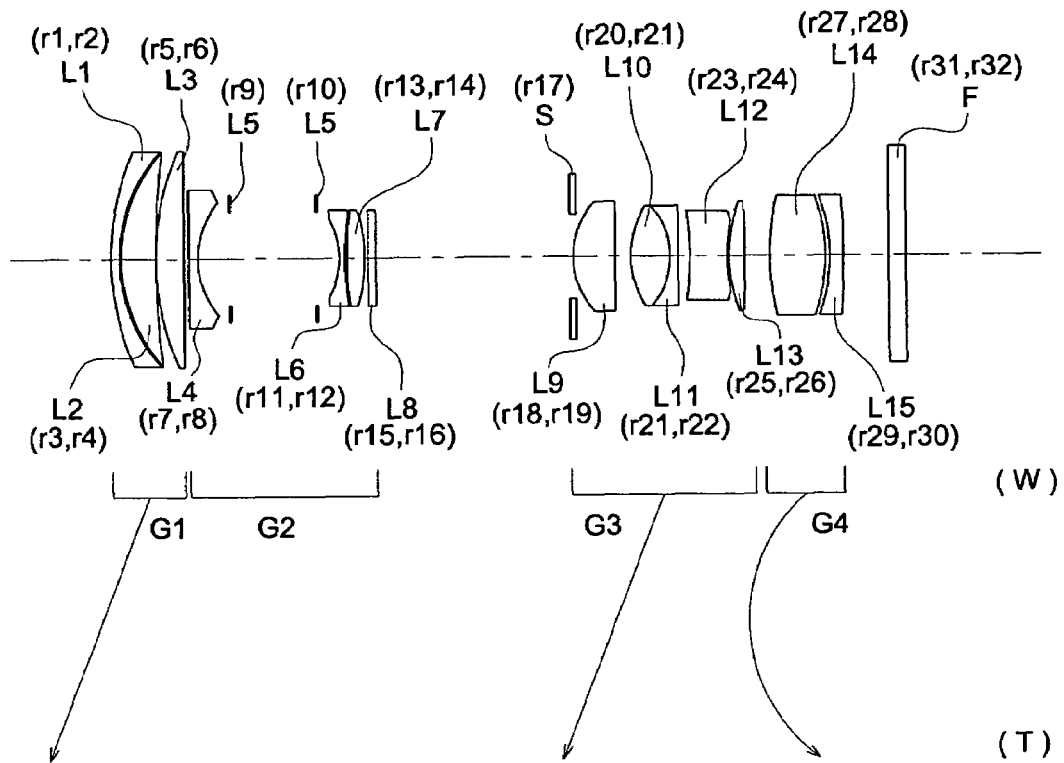
FIG. 4 is a diagram showing the structure of an imaging optical system of the digital camera as a second embodiment.

FIG. 4 shows the second embodiment. The imaging optical system of FIG. 4 is formed of a first lens group G1 having a positive refractive power, a second lens group G2 having negative refractive power, aperture stop S and as following lens groups, a third lens group G3 having a positive refractive power and a fourth lens group G4 having a positive refractive power. They are arranged in that order from the object side. A parallel flat plate F which is equivalent to a low pass filter and a cover glass lies on the image side of the imaging optical system.

The first lens group G1 is made up of a negative meniscus lens L1 with the convex side facing the object, a positive meniscus lens L2 with the convex side facing the object side, and a positive meniscus lens L3 with the convex side facing the object side. They are arranged in that order from the object side.

The second lens group G2 is formed of a biconcave negative lens L4 wherein the surface on the image side forms an aspherical surface, a mirror L5 indicated by an air gap in the Figure, a biconcave negative lens L6, a biconvex positive lens L7 and a biconcave negative lens L8. They are arranged in that order from the object side.

The third lens group G3 contains a positive meniscus lens L9 with the concave surface facing the object side, a biconvex positive lens L10, a biconcave negative lens L11 cemented to the lens L10, a biconcave negative lens L12 wherein the surface on the image side forms an aspherical surface, and a biconvex positive lens L13. They are arranged in that order from the object side.

The fourth lens group includes a biconvex positive lens L13 wherein both surfaces are aspherical, and a negative meniscus lens L14 with the concave surface facing the object side. They are arranged in that order from the object.

During zooming from the wide angle end to the telephoto end, the first lens group G1 moves toward the object side. The second lens group G2 is stationary with respect to the image surface. The third lens group G3 moves toward the object side. The fourth lens group G4 first moves toward the object side, and travels toward the image surface between around the intermediate focal length and the telephoto end.

Figure 5:
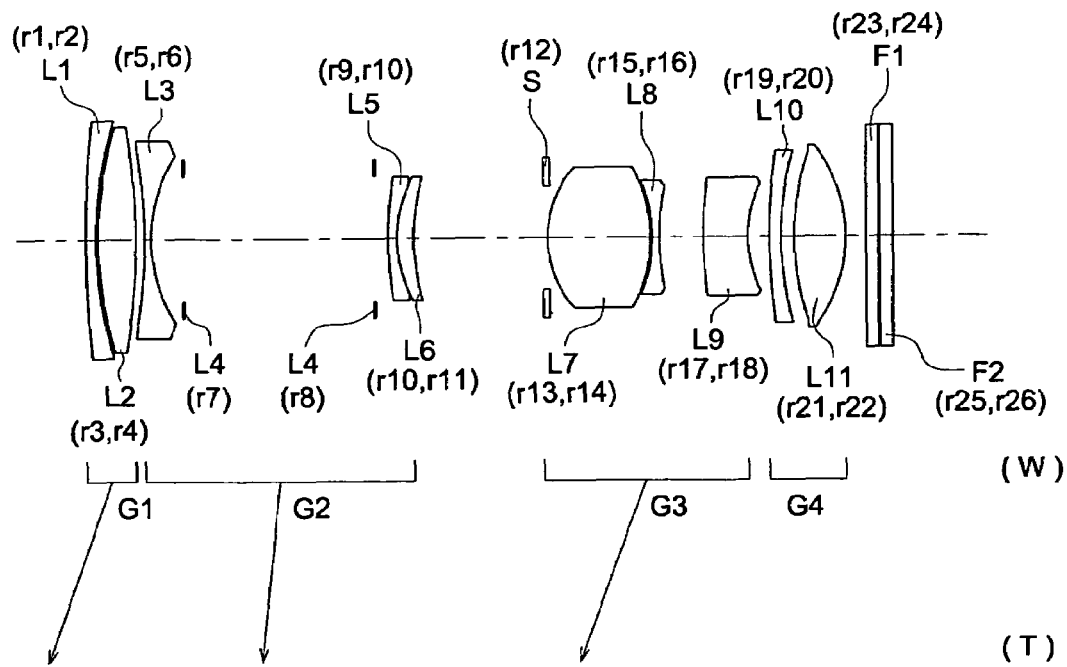
FIG. 5 is a diagram showing the structure of an imaging optical system of the digital camera as a third embodiment.

FIG. 5 shows the third embodiment. The imaging optical system of FIG. 5 is formed of a first lens group G1 having a positive refractive power, a second lens group G2 having a negative refractive power, aperture stop S and, as following lens groups, a third lens group G2 having a positive refractive power and a fourth lens group G4 having a positive refractive power. They are arranged in that order from the object side. A low-pass filter F1 and a cover glass F2 lie on the image surface side of the imaging optical system.

The first lens group G1 is made up of a negative meniscus lens L1 with the convex side facing the object side, wherein the surface on the image side is aspherical, and a biconvex positive lens L2. They are arranged in that order from the object side.

The second lens group G2 is formed of a biconcave negative lens L3, a mirror L4 indicated by an air gap in the Figure, a negative meniscus lens L5 with the convex surface facing the object, and a positive meniscus lens L6 cemented to the lens L5 with concave surface facing the image side.

The third lens group G3 contains a biconvex positive lens L7, a biconcave negative lens L8 wherein the surface on the image side forms an aspherical surface, and a negative meniscus lens L9 with convex surface facing the image side. They are arranged in that order from the object side.

The fourth lens group is formed of a negative meniscus lens L10 with convex surface facing the object side, and a biconvex positive lens L11 wherein both surfaces are aspherical. They are arranged in that order from the object side.

At the time of zooming from the wide angle end to the telephoto end, the first lens group G1 moves toward the object side, and the second lens group G2 goes toward the object side. The third lens group G3 travels toward the object side, and the fourth lens group G4 is stationary with respect to the image surface.

Figure 6:
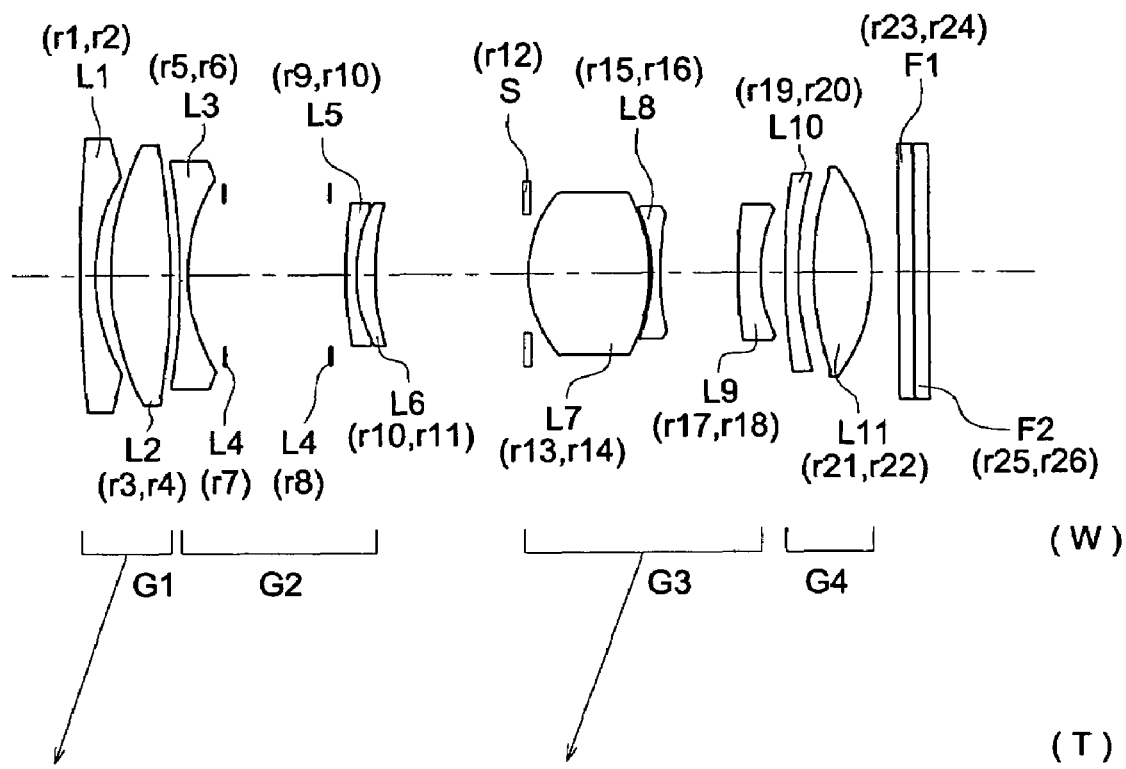
FIG. 6 is a diagram showing the structure of an imaging optical system of the digital camera as a fourth embodiment.

FIG. 6 shows the fourth embodiment. The imaging optical system of FIG. 6 is formed of a first lens group G1 having positive refractive power, a second lens group G2 having negative refractive power, aperture stop S and, as a following lens groups, a third lens group G3 having positive refractive power and a fourth lens group G4 having a positive refractive power. They are arranged in that order from the object side. A low-pass filter F1 and a cover glass F2 lie on the image surface side of the imaging optical system.

The first lens group G1 is made up of a negative meniscus lens L1 with the convex side facing the object side, wherein the surface on the image side is aspherical, and a biconvex positive lens L2. They are arranged in that order from the object side.

The second lens group G2 is formed of a biconcave negative lens L3, a mirror L4 indicated by an air gap in the Figure, a negative lens L5 with the concave surface facing the image surface, and a positive meniscus lens L6 cemented to the lens L5 with concave surface facing the image side.

The third lens group G3 contains a biconvex positive lens L7, a biconcave negative lens L8 wherein the surface on the image side forms an aspherical surface, and a negative meniscus lens L9 with convex surface facing the object side. They are arranged in that order from the object side.

The fourth lens group is formed of a negative meniscus lens L10 with convex surface facing the object side, and a biconvex positive lens L11 wherein both surfaces are aspherical. They are arranged in that order from the object side.

During zooming from the wide angle end to the telephoto end, the first lens group G1 moves toward the object side, and the second lens group G2 is stationary with respect to the image surface. The third lens group G3 travels toward the object side, and the fourth lens group G4 is stationary with respect to the image surface.

Figure 7:
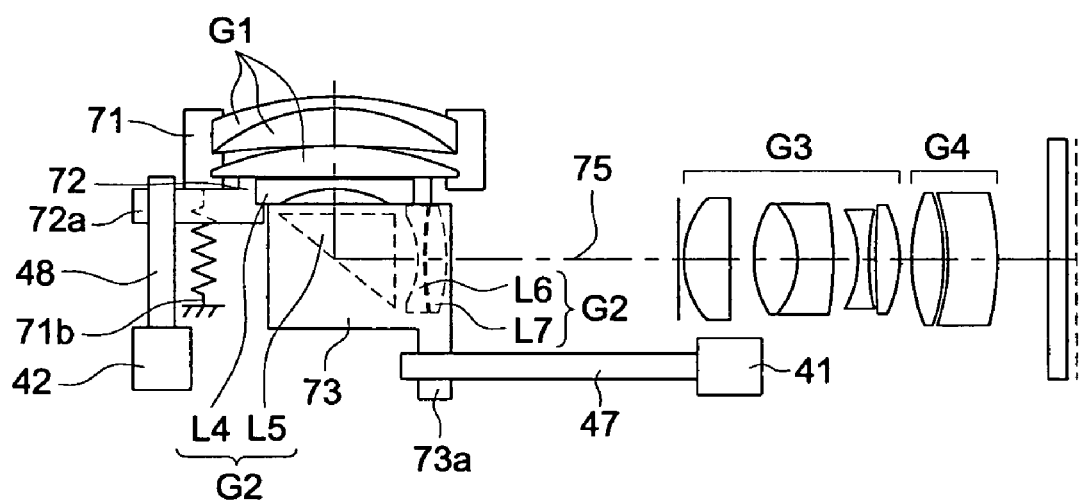
FIG. 7(a) is a schematic diagram representing how the imaging optical system of the first embodiment is used.
FIG. 7(b) is a schematic diagram representing how the imaging optical system of the first embodiment is collapsed.
Figure 7:
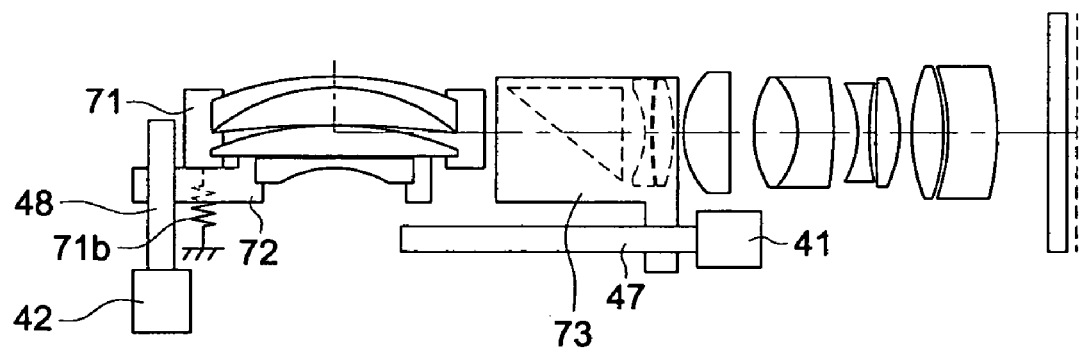

The following describes the structure and operation wherein the lenses located on the object side of reflective optical element are collapsed. FIG. 7(a) shows how the wide angle end of the imaging optical system in the first embodiment is used. FIG. 7(b) shows how the first lens group G1 and the lens L4 of the second lens group G2 in the imaging optical system are housed.

To terminate imaging, the user turns off the power button 20 of the digital camera 1. In response to the signal from the power button 20, the control section 26 controls the drive of the motor 41 that drives the collapsing mechanism, and rotates the drive shaft 47.

When the drive shaft 47 rotates, the engagement section 73a of the reflecting section holding frame 73 holding the prism L5 screwed to the drive shaft 47 makes straight traveling toward the image side along the optical axis 75 by linkage with a straight traveling guide (not illustrated). This movement provides a space to house the first holding frame 71 for holding the first lens group G1 and the second lens holding frame 72 for holding the lens L4.

Then the motor 42 is driven under control, and the drive shaft 48 rotates. Then the engagement section 73a of the second lens holding member 72 screwed to the drive shaft 48 is linked with the straight traveling guide (not illustrated) so that second lens holding frame 72 goes to the storage space. The first holding frame 71 is kept in contact with the second lens holding member 72 at all times by the spring 71b of the first holding member 71, and is moved into the storage space synchronously with the second lens holding member 72.

When the first holding frame 71 and second lens holding frame 72 have reached a predetermined storage site of the storage space, a signal is issued to instruct the motor 41 to be stopped.

Figure 8:
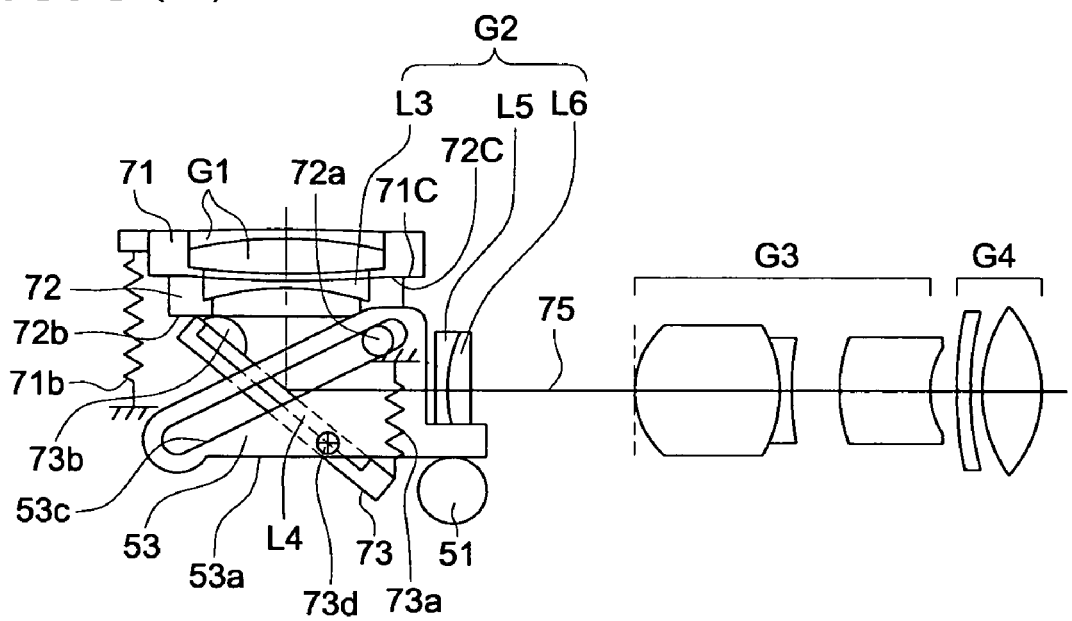
FIG. 8(a) is a schematic diagram representing how the imaging optical system of the third embodiment is used.
FIG. 8(b) is a schematic diagram representing how the imaging optical system of the third embodiment is collapsed.
Figure 8:
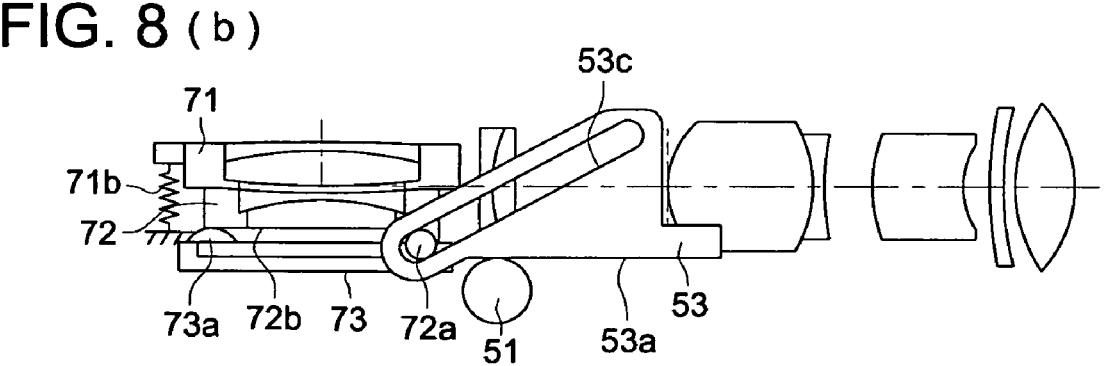
Figure 10:
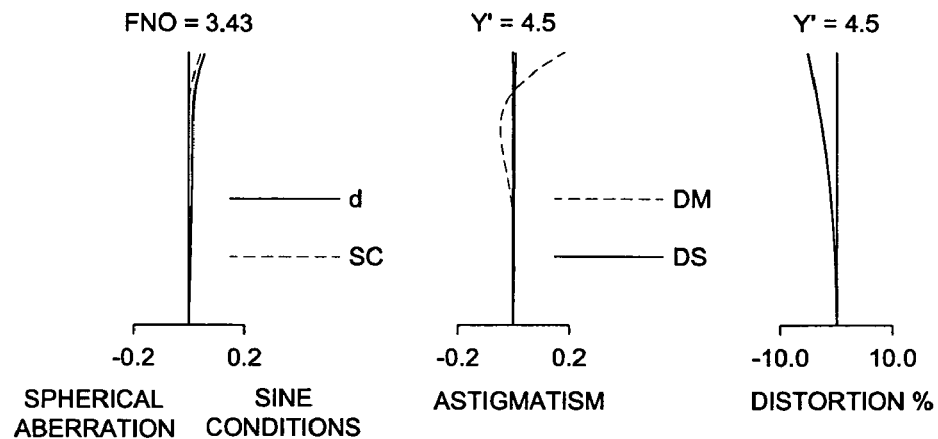
FIG. 10(a) is a diagram showing the aberration at the wide angle end of the imaging optical system of the digital camera of the second embodiment.
FIG. 10(b) is a diagram showing the aberration at the intermediate focal length of the imaging optical system of the digital camera of the second embodiment.
FIG. 10(c) is a diagram showing the aberration at the telephoto end of the imaging optical system of the digital camera of the second embodiment.
Figure 10:
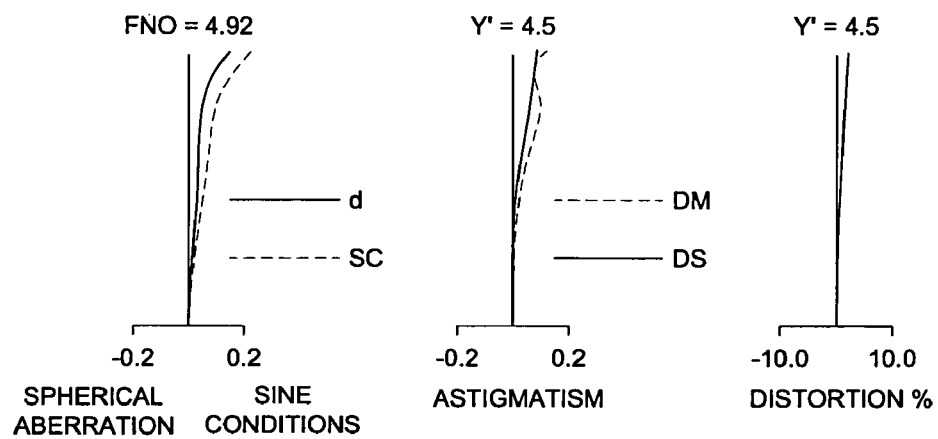
Figure 10:
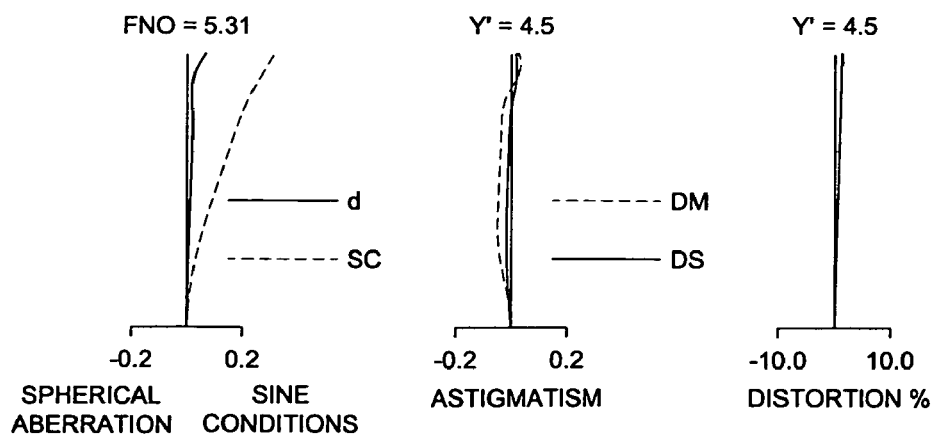
Figure 11A:
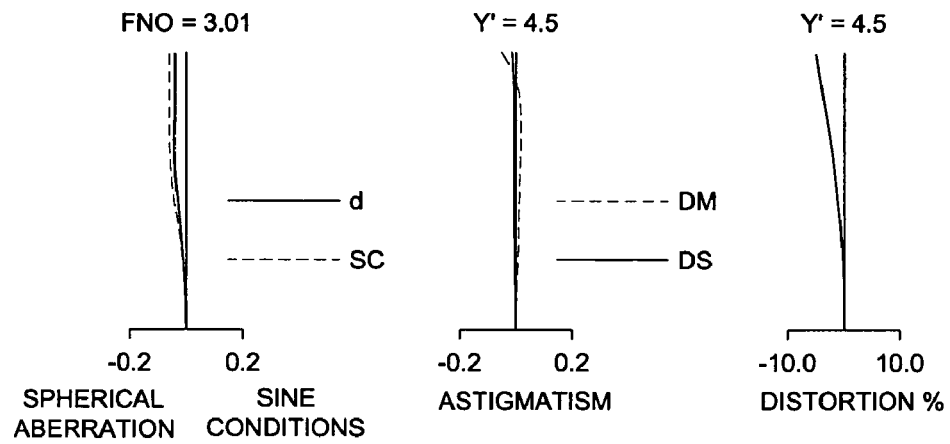
FIG. 11(a) is a diagram showing the aberration at the wide angle end of the imaging optical system of the digital camera of the third embodiment.
Figure 11B:
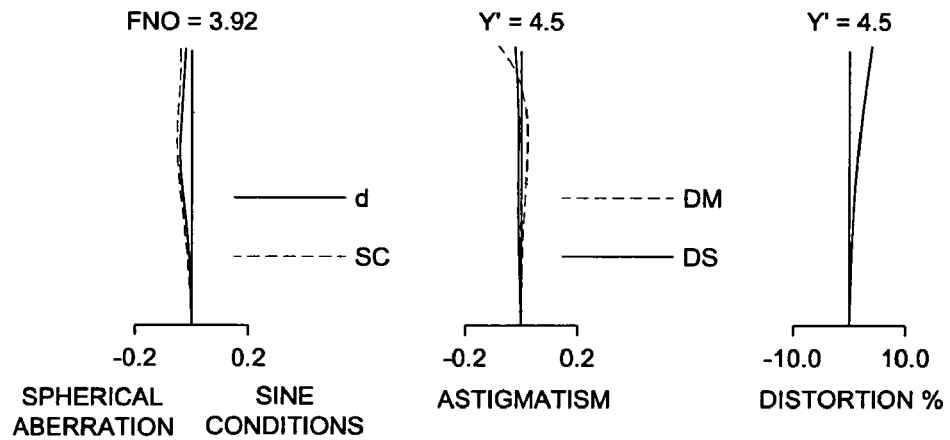
FIG. 11(b) is a diagram showing the aberration at the intermediate focal length of the imaging optical system of the digital camera of the third embodiment.
Figure 11C:
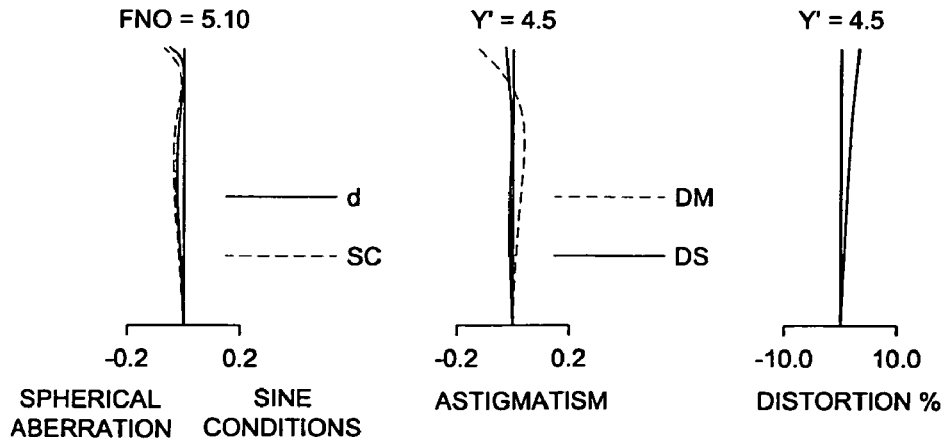
FIG. 11(c) is a diagram showing the aberration at the telephoto end of the imaging optical system of the digital camera of the third embodiment.
Figure 12:
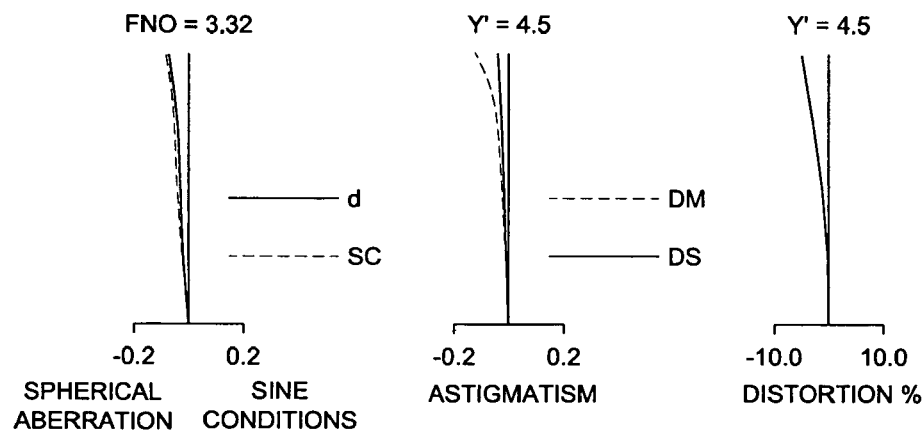
FIG. 12(a) is a diagram showing the aberration at the wide angle end of the imaging optical system of the digital camera of the fourth embodiment.
FIG. 12(b) is a diagram showing the aberration at the intermediate focal length of the imaging optical system of the digital camera of the fourth embodiment.
FIG. 12(c) is a diagram showing the aberration at the telephoto end of the imaging optical system of the digital camera of the fourth embodiment.
Figure 12:
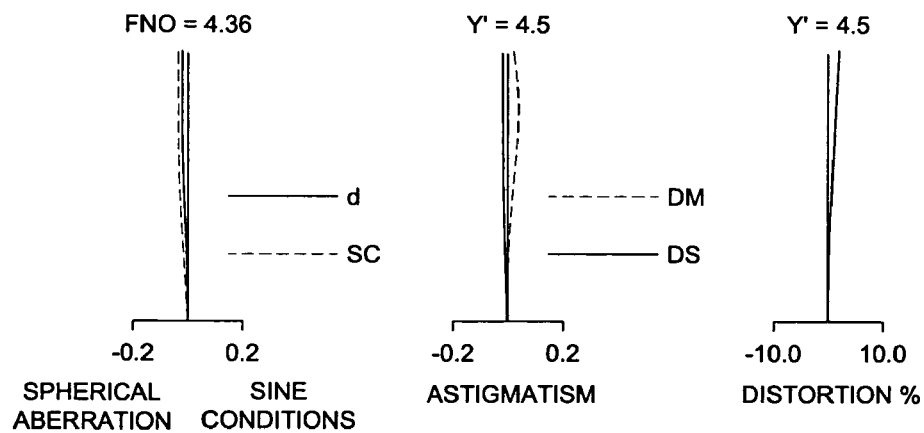
Figure 12:
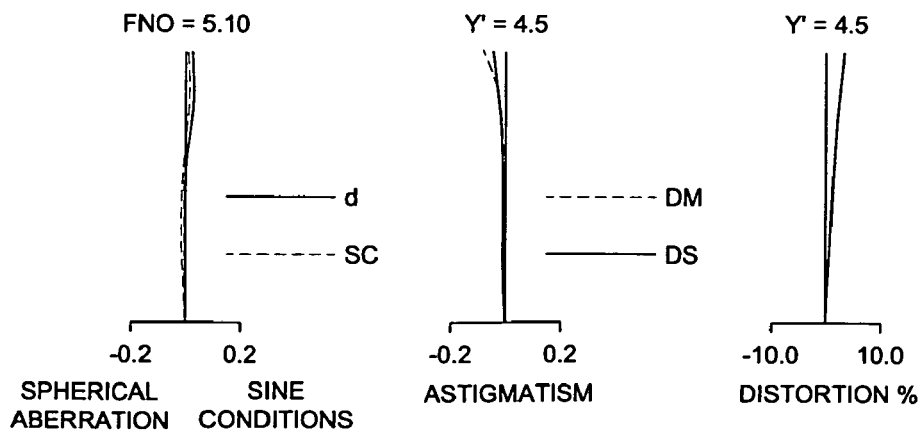

In FIG. 7(a) and FIG. 7(b), a prism is used as the reflective optical element. FIG. 8(a) and FIG. 8(b) illustrate the arrangement and operation when a mirror is used as the reflective optical element. FIG. 8(a) shows how the imaging optical system of the third embodiment is used. FIG. 8(b) shows how the first lens group G1 and the lens L3 of the second lens group G2 are collapsed.

Similarly to the cases of FIG. 7(a) and FIG. 7(b), the power button 20 is turned off to terminate imaging operation. A motor (not illustrated) is driven under control, thereby rotating the gear 51 that drives the collapsing mechanism through the speed reduction system.

When the gear 51 rotates, the operation plate 53 makes a straight traveling toward the image surface along the optical axis 75 by the linkage between the rack 53a of the operation plate 53 meshing with the gear 51 and the straight traveling guide (not illustrated).

The operation plate 53 is provided with a cam slot 53c for guiding the pin 72a of the second lens holding frame 72 that holds the lens L3. When the operation plate 53 moves toward the image surface, the second lens holding frame 72 is guided by the cam slot 53c, and is moved in the direction of collapsing below in the Figure by the linkage with the straight traveling guide (not illustrated).

The second lens holding frame 72 is provided with a contact section 72b kept in contact with the protrusion 73b of the reflecting section holding frame 73 that holds the mirror L4; and a contact section 72c kept in contact with the plane surface section 71c of the first holding frame 71 that holds the first lens group G1. When the second lens holding frame 72 moves toward the bottom in the Figure, the protrusion 73b is held in contact with the contact section 72b of the second lens holding frame 72 by the spring 73a of the reflecting section holding frame 73. While rotating about the rotary axis 73d, the reflecting section holding frame 73 is pushed below toward the bottom of the Figure. With the download movement of the second lens holding frame 72, the plane surface section 71c of the first holding member 71 is constantly held in contact with the contact section 72c of the second lens holding frame 72 by the spring 71b of the first holding member 71, and the first holding frame 71 is moved toward the bottom of the Figure. Then the first holding frame 71 and second lens holding frame 72 are collapsed in the storage space created by the retreat of the reflecting section holding frame 73.

When the first holding frame 71 and second lens holding frame 72 have reached the predetermined storage site of the storage space, a signal is issued to instruct the motor (not illustrated) to be stopped.

In the embodiments described so far, the imaging optical system that forms an image on the image pickup device using the light from the object is provided with the first lens group of positive refractive power, the second lens group of negative refractive power, and the following lens group, wherein the second lens group includes reflective optical element for bending the optical path. Further, a lens is provided on the object side of the reflective optical element and another lens on the image surface side. At least the first lens group and the following lens group are moved to change in the magnification.

When this arrangement is adopted, the light flux going out of the first lens group of positive refractive power is converged in the vicinity of the optical axis to enter the second lens group. This reduces the effective diameter of the second lens group, and hence reduces the size of the reflective optical element provided on the second lens group and the size of the digital camera along the depth.

This arrangement meets the following relationship 1:

$$-0.6 < \phi 1/\phi 2 < -0.15 \qquad \text{relationship 1}$$

where $\phi 1$ denotes the refractive power of the first lens group, and $\phi 2$ indicates the refractive power of the second lens group.

According to relationship 1, the refractive power of the first lens group with respect to the refractive power of the second lens group is defined within the adequate range. Thus, the axial distance of the first lens group and the outer diameter of the lens of the first lens group are reduced. If the value for $\phi 1/\phi 2$ is reduced below the lower limit of the relationship 1, the refractive power of the first lens group will be excessive, and the correction of the spherical aberration will be insufficient at the telephoto end. This will lead to deterioration of the optical performances. Conversely, if the value for the φ1/φ2 exceeds the upper limit of the relationship 1, the refractive power of the first lens group will be reduced, and the entrance pupil will be closer to the image surface. This will increase the effective diameter of the light flux entering the first lens group, and will also increase the thickness of the lens, with the result that the size of the first lens group will be increased.

It is preferred to satisfy the relationship of the relationship 1' in place of the relationship 1.

$$-0.35 < \phi1/\phi2 < -0.15 \quad \text{relationship 1'}$$

It is also preferred to satisfy the relationship of the relationship 2:

$$0.6 < Df/Y\text{max} < 2.5 \quad \text{relationship 2}$$

where Df indicates the on-axis distance between the most object side surface of the first lens group and the most image side surface of the lens located on the object side of the reflective optical element at the wide angle end, and Ymax is the maximum height of the image.

In relationship 2, the on-axis distance between the most object side surface of the first lens group and the most image side surface of the lens located on the object side of the reflective optical element with respect to the maximum image height at the wide angle end is defined within the adequate range. If the value for the Df/Ymax in the relationship has reduced below the lower limit, the lens required to correct the aberration cannot be arranged. Thus, the aberration cannot be corrected sufficiently. Conversely, if the value for Df/Ymax has exceeded the upper limit of the relationship 2, the on-axis distance will be increased and the depth of the camera will be increased.

It is more preferred to satisfy the relationship of the relationship 2' instead of relationship 2.

$$1 < Df/Y\text{max} < 2 \quad \text{relationship 2'}$$

Further, in the second lens group, the lens provided on the object side of the reflective optical element is preferably made up of one negative lens. This arrangement reduces the angle of the light entering the reflective optical element, whereby the reflective optical element can be reduced and the axial distance on the object side from the reflective optical element can be reduced.

The relationship of the following relationship 3 is preferably satisfied:

$$0.35 < \phi3/\phi w < 1.5 \quad \text{relationship 3}$$

where φ3 denotes the refractive power of the third lens group contained in the following lens group and φw indicates the refractive power of the entire system at the wide angle end.

In relationship 3, the refractive power of the third lens group with respect to the refractive power of the entire system at the wide angle end is defined within the adequate range, and adequate correction of the spherical aberration is ensured. If the value for φ3/φw has reduced below the lower limit of relationship 3, the spherical aberration will be subjected to excessive correction, with the result that the optical performances are reduced. Conversely, if the value for φ3/φw has exceeded the upper limit of the relationship 3, correction of the spherical aberration will be insufficient and the optical performances will be reduced.

It is more preferred to satisfy the relationship of relationship 3' instead of relationship 3:

$$0.35 < \phi3/\phi w < 1 \quad \text{relationship 3'}$$

The first lens group and the lens on the object side of the reflective optical elements of the second lens groups are collapsed into the space created by the retreat of the reflective optical element at the time of collapsing. When this structure is adopted, the optical element installed on the object side of the reflective optical element can be housed in the digital camera. This ensures further reduction in the size of the digital camera in the non-imaging mode.

The digital camera for capturing a still image is adopted as an example in the description of the aforementioned embodiments. The imaging optical system of the present invention can be used in a digital video camera for capturing a motion picture, and a camera built in the mobile computer, cellular phone, PDA (Personal Digital Assistant) and other related information processing apparatuses.

EXAMPLE

The following specifically describes the structure of the imaging optical system included in the imaging apparatus based on the present invention, with reference to the construction data and aberration diagram. The Examples 1 through 4 described below correspond to the aforementioned first through fourth embodiments, respectively. The lens structure diagrams (FIGS. 3 through 6) representing the first through fourth embodiments show the structures of the corresponding lens in Example 1 through 4, respectively.

In the construction data given in Tables 1 through 8, "r" denotes a curvature radius, and numbers are assigned in order from the object. The axial distance is represented by "d". The axial distances from the object are represented in order from the top of the Table. For the axial distance that is changed by zooming, the values at the wide angle end, intermediate focal length and at the telephoto end are represented in order from the left. The refractive index and Abbe number are indicated by "N" and "ν", and the refractive index and Abbe number from the object are given in order from the top of the Table. Further, the refractive index and Abbe number are with reference to the d line. The refractive index and Abbe number for air are omitted. In Examples 2 through 4, the reflective optical element is a mirror, and the distance from the incoming surface of the mirror to the outgoing surface corresponds to air. The refractive index and Abbe number of the reflective optical element are omitted. To show the aspherical surface, an asterisk (*) is added to the end of the surface number as a suffix. The image pickup device is arranged behind the last surface of the optical system. The focal lengths (f) of the entire system are shown at each focal length of the wide angle end, intermediate focal length and telephoto end, and the F-numbers (FNO) are shown with other. The focal length, curvature radius and on-axis distance are given in millimeters.

The aspherical surface is defined by the following Equation 4:

$$X(H) = C \cdot H^2 / \{1 + (1 - \epsilon \cdot C^2 \cdot H^2)^{1/2}\} + \Sigma Ak \cdot Hk \quad \text{Equation 4}$$

where H is the height perpendicular to the optical axis, X(H) is the amount of displacement along the optical axis at height H (surface vertex reference), C is a paraxial curvature, ε is a quadratic curved surface parameter, k is the order of the aspherical surface, and Ak is an aspherical surface coefficient of k-th order.

The aberration diagrams shown in FIG. 9(a), FIG. 9(b), FIG. 9(c) through FIG. 12(a), FIG. 12(b), FIG. 12 (c) indicate the aberrations at the wide angle end (a), intermediate focal length (b) and telephoto end (c). Line d of the spherical aberration indicates the aberration of the d line, and line SC represents the amount of failure in meeting the sine condition. The line DM and line DS of the astigmatism denote the aberrations on the meridional and sagittal surfaces, respectively. Only the horizontal axis of distortion is represented in percentage. All other axes are given in millimeters.

Table 9 shows the values of the Examples corresponding to the conditional expression. The conditional expression is satisfied in all Examples.

The embodiment of the present invention provides an compact imaging optical system characterized by sufficient aberration correction and a compact imaging apparatus, wherein a zoom lens contains a first lens group G1 having positive refractive power, a second lens group G2 having negative refractive power, and a following lens group; and the second lens group includes a reflective optical element for bending the optical path in an approximately rectangular form. A lens is provided on the object side of the reflective optical element and another lens on the image side, and the relationship between the refractive power of the first lens group and that of the second lens group is defined within the adequate range.

TABLE 1

<Example 1>
f = 7.40-36.95-73.84
FNO = 3.09-4.76-5.48

| Surface No. | Curvature radius (r) | Axial distance (d) | Refractive index (N) | Abbe number (ν) |
|---|---|---|---|---|
| 1 | 26.568 | 0.80 | 1.86541 | 30.50 |
| 2 | 17.081 | 0.20 | | |
| 3 | 17.032 | 3.39 | 1.51424 | 64.96 |
| 4 | 76.377 | 0.20 | | |
| 5 | 27.642 | 2.61 | 1.56813 | 57.26 |
| 6 | 1322.136 | 0.53-14.56-20.53 | | |
| 7 | −1070.822 | 0.80 | 1.874710 | 35.25 |
| 8* | 8.136 | 2.53 | | |
| 9 | ∞ | 9.80 | 1.84666 | 23.82 |
| 10 | ∞ | 1.49 | | |
| 11 | −10.269 | 0.70 | 1.71365 | 46.53 |
| 12 | 42.207 | 0.20 | | |
| 13 | 40.139 | 1.71 | 1.84666 | 23.78 |
| 14 | −17.682 | 20.58-2.68-0.50 | | |
| 15 | ∞ | 0.50 | | |
| 16* | 8.593 | 4.00 | 1.57036 | 40.21 |
| 17 | 70.727 | 1.87 | | |
| 18 | 11.250 | 3.93 | 1.49700 | 81.61 |
| 19 | −7.711 | 3.00 | 1.84666 | 23.78 |
| 20 | 49.101 | 1.67 | | |
| 21 | −8.951 | 1.00 | 1.85640 | 26.91 |
| 22* | 31.175 | 0.64 | | |
| 23 | 40.958 | 1.94 | 1.75000 | 25.14 |
| 24 | −13.306 | 1.29-8.57-24.24 | | |
| 25* | 20.732 | 2.70 | 1.53048 | 55.72 |
| 26* | −16.828 | 0.77 | | |
| 27 | −12.701 | 3.92 | 1.88300 | 40.80 |
| 28 | −31.349 | 4.86-15.49-2.00 | | |
| 29 | ∞ | 1.36 | 1.51680 | 64.20 |
| 30 | ∞ | | | |

TABLE 2

[Aspherical surface data]

r8

$\epsilon = 1.0000$
$A4 = -1.32079 \times 10^{-4}$
$A6 = -6.65811 \times 10^{-7}$
$A8 = -4.17701 \times 10^{-8}$ r16

$\epsilon = 1.0000$
$A4 = -2.81346 \times 10^{-5}$
$A6 = 5.40797 \times 10^{-8}$ r22

$\epsilon = 1.0000$
$A4 = 2.66747 \times 10^{-4}$
$A6 = -9.02327 \times 10^{-7}$
$A8 = 7.12789 \times 10^{-13}$ r25

$\epsilon = 1.0000$
$A4 = 2.53077 \times 10^{-5}$
$A6 = 2.84901 \times 10^{-6}$
$A8 = 0.00000 \times 10 + 00$ r26

$\epsilon = 1.0000$
$A4 = -6.41547 \times 10^{-5}$
$A6 = 3.29452 \times 10^{-6}$
$A8 = -2.73680 \times 10^{-8}$

TABLE 3

<Example 2>
f = 7.41-37.00-73.97
FNO = 3.43-4.92-5.31

| Surface No. | Curvature radius (r) | Axial distance (d) | Refractive index (N) | Abbe number (ν) |
|---|---|---|---|---|
| 1 | 35.516 | 0.80 | 1.84666 | 23.82 |
| 2 | 21.159 | 0.31 | | |
| 3 | 21.888 | 2.99 | 1.48750 | 70.44 |
| 4 | 244.645 | 0.20 | | |
| 5 | 24.403 | 2.46 | 1.70724 | 46.84 |
| 6 | 200.353 | 0.92-14.68-19.19 | | |
| 7 | −61.699 | 0.80 | 1.87957 | 38.32 |
| 8* | 8.736 | 2.37 | | |
| 9 | ∞ | 10.50 | | |
| 10 | ∞ | 1.37 | | |
| 11 | −10.602 | 0.70 | 1.70144 | 47.13 |
| 12 | 25.766 | 0.23 | | |
| 13 | 28.977 | 1.66 | 1.84666 | 23.78 |
| 14 | −20.746 | 0.20 | | |
| 15 | −4476.156 | 0.60 | 1.87275 | 34.14 |
| 16 | 11211.315 | 16.36-3.00-0.50 | | |
| 17 | ∞ | 0.50 | | |
| 18* | 7.986 | 4.00 | 1.56625 | 40.96 |
| 19 | 41.008 | 2.26 | | |
| 20 | 9.072 | 3.54 | 1.49700 | 81.61 |
| 21 | −6.982 | 0.70 | 1.84666 | 23.78 |
| 22 | 381.521 | 1.31 | | |
| 23 | −23.246 | 3.14 | 1.88300 | 40.80 |
| 24* | 17.164 | 0.50 | | |
| 25 | 11.797 | 1.74 | 1.59701 | 36.17 |
| 26 | −142.882 | 4.2-5.48-18.10 | | |
| 27* | 26.736 | 5.00 | 1.53048 | 55.72 |
| 28* | −12.687 | 0.50 | | |
| 29 | −13.062 | 1.00 | 1.88300 | 40.80 |
| 30 | −37.956 | 5.22-17.29-7.17 | | |
| 31 | ∞ | 1.36 | 1.51680 | 64.20 |
| 32 | ∞ | | | |

TABLE 4

[Aspherical surface data]

r8

$\epsilon = 1.0000$
$A4 = -1.85391 \times 10^{-4}$
$A6 = -2.43083 \times 10^{-6}$
$A8 = -7.94612 \times 10^{-9}$ r18

$\epsilon = 1.0000$
$A4 = -3.38970 \times 10^{-5}$
$A6 = -2.63181 \times 10^{-8}$ r24

$\epsilon = 1.0000$
$A4 = 4.76221 \times 10^{-4}$
$A6 = 1.26398 \times 10^{-6}$
$A8 = 3.89310 \times 10^{-8}$ r27

$\epsilon = 1.0000$
$A4 = 1.37369 \times 10^{-5}$
$A6 = -2.17983 \times 10^{-6}$ r28

$\epsilon = 1.0000$
$A4 = 2.26354 \times 10^{-6}$
$A6 = -3.55790 \times 10^{-6}$
$A8 = 4.00382 \times 10^{-8}$

TABLE 5

<Example 3>
f = 7.88-13.40-22.46
FNO = 3.01-3.92-5.10

| Surface No. | Curvature radius (r) | Axial distance (d) | Refractive index (N) | Abbe number (ν) |
|---|---|---|---|---|
| 1 | 84.172 | 0.73 | 1.99269 | 17.46 |
| 2* | 30.653 | 0.12 | | |
| 3 | 30.098 | 2.65 | 1.87317 | 34.37 |
| 4 | -47.904 | 0.50-3.98-7.58 | | |
| 5 | -51.643 | 0.60 | 1.88300 | 40.79 |
| 6 | 11.415 | 1.87 | | |
| 7 | ∞ | 14.34 | | |
| 8 | ∞ | 0.50 | | |
| 9 | 32.076 | 0.60 | 1.59849 | 51.34 |
| 10 | 8.636 | 1.13 | 1.84666 | 23.82 |
| 11 | 15.501 | 9.33-4.77-1.59 | | |
| 12 | ∞ | 0.10 | | |
| 13 | 7.275 | 7.35 | 1.80451 | 46.34 |
| 14 | -11.933 | 0.14 | | |
| 15 | -10.619 | 0.60 | 1.98547 | 19.23 |
| 16* | 61.892 | 3.13 | | |
| 17 | 39.012 | 3.10 | 1.84666 | 23.82 |
| 18 | 8.511 | 1.67-6.27-12.00 | | |
| 19 | 51.651 | 0.70 | 1.88300 | 40.79 |
| 20 | 25.000 | 0.90 | | |
| 21* | 14.872 | 3.52 | 1.53048 | 55.72 |
| 22* | -10.122 | 1.65 | | |
| 23 | ∞ | 0.80 | 1.54426 | 69.60 |
| 24 | ∞ | 0.10 | | |
| 25 | ∞ | 0.80 | 1.51680 | 64.20 |
| 26 | ∞ | 0.60 | | |

TABLE 6

[Aspherical surface data]

r2

$\epsilon = 1.0000$
$A4 = 8.13303 \times 10^{-6}$

TABLE 6-continued

[Aspherical surface data]

$A6 = 6.55446 \times 10^{-9}$
$A8 = -1.38923 \times 10^{-10}$
$A8 = 3.75804 \times 10^{-12}$ r16

$\epsilon = 1.0000$
$A4 = 9.63921 \times 10^{-4}$
$A6 = 2.43660 \times 10^{-5}$
$A4 = 2.25877 \times 10^{-7}$
$A6 = 8.50646 \times 10^{-8}$ r21

$\epsilon = 1.0000$
$A4 = 7.84314 \times 10^{-6}$
$A6 = -9.38640 \times 10^{-7}$
$A8 = -1.06675 \times 10^{-7}$ r22

$\epsilon = 1.0000$
$A4 = 3.44265 \times 10^{-4}$
$A6 = 5.38542 \times 10^{-7}$
$A8 = -3.26559 \times 10^{-7}$
$A10 = 3.91953 \times 10^{-9}$

TABLE 7

<Example 4>
f = 7.88-13.40-22.47
FNO = 3.32-4.36-5.10

| Surface No. | Curvature radius (r) | Axial distance (d) | Refractive index (N) | Abbe number (ν) |
|---|---|---|---|---|
| 1 | 75.163 | 0.73 | 1.747459 | 21.29 |
| 2* | 11.083 | 1.72 | | |
| 3 | 13.632 | 2.80 | 1.873695 | 34.66 |
| 4 | -42.387 | 0.60-2.84-7.48 | | |
| 5 | -36.943 | 0.60 | 1.883 | 40.79 |
| 6 | 10.324 | 1.24 | | |
| 7 | ∞ | 6.42 | | |
| 8 | ∞ | 0.50 | | |
| 9 | ∞ | 0.60 | 1.679508 | 54.51 |
| 10 | 9.339 | 1.11 | 1.851996 | 25.43 |
| 11 | 42.613 | 9.07-4.48-1.28 | | |
| 12 | ∞ | 0.10 | | |
| 13 | 7.028 | 7.15 | 1.808463 | 45.99 |
| 14 | -8.932 | 0.14 | | |
| 15 | -7.9 | 0.60 | 1.983763 | 19.71 |
| 16* | 110.279 | 3.50 | | |
| 17 | 16.558 | 1.65 | 1.84666 | 23.82 |
| 18 | 8.125 | 1.69-6.28-9.48 | | |
| 19 | 29.672 | 0.70 | 1.869792 | 32.58 |
| 20 | 18.182 | 0.97 | | |
| 21* | 16.066 | 3.11 | 1.53048 | 55.72 |
| 22* | -12.704 | 1.44 | | |
| 23 | ∞ | 0.80 | 1.54426 | 69.6 |
| 24 | ∞ | 0.10 | | |
| 25 | ∞ | 0.80 | 1.5168 | 64.2 |
| 26 | ∞ | 0.60 | | |

TABLE 8

[Aspherical surface data]

r2

$\epsilon = 1.0000$
$A4 = 1.31495 \times 10^{-6}$
$A6 = -9.76422 \times 10^{-8}$
$A8 = 3.18969 \times 10^{-9}$
$A8 = -4.72902 \times 10^{-11}$ TABLE 8-continued

[Aspherical surface data]

r16

ε = 1.0000
A4 = 1.02291 × 10⁻³
A6 = 2.62586 × 10⁻⁵
A4 = 5.76069 × 10⁻⁷
A6 = 5.03795 × 10⁻⁸ r21

ε = 1.0000
A4 = 2.63373 × 10⁻⁴
A6 = −4.32951 × 10⁻⁶
A8 = 2.37044 × 10⁻⁷ r22

ε = 1.0000
A4 = 5.89313 × 10⁻⁴
A6 = −1.18035 × 10⁻⁵
A8 = 1.91559 × 10⁻⁷
A10 = 3.32403 × 10⁻⁹

TABLE 9

[Value corresponding to conditional expression]

| | $\phi 1/\phi 2$ | Df/Ymax | $\phi 3/\phi W$ |
|---|---|---|---|
| Example 1 | −0.205 | 1.895 | 0.427 |
| Example 2 | −0.188 | 1.883 | 0.444 |
| Example 3 | −0.234 | 1.021 | 0.707 |
| Example 4 | −0.308 | 1.432 | 0.758 |

What is claimed is:

1. An imaging optical system for imaging light from an object side on an image pickup device, comprising:
a first lens group with positive power on an object side;
a reflective optical element on an image side of the first lens group, for bending an optical axis substantially perpendicularly;
a second lens group with negative power which includes a lens on the object side of the reflective optical element and a lens on the image side of the reflective optical element; and
a following lens group on the image side of the second lens group,
wherein the imaging optical system is a zoom lens, and power $\phi 1$ of the first lens group and power $\phi 2$ of the second lens group satisfy the following relationship:

$-0.6 < \phi 1/\phi 2 < -0.15$.

2. The imaging optical system of claim 1, wherein a zoom ratio of the imaging optical system is not less than 2.5.

3. The imaging optical system of claim 1, wherein at least the first lens group and the following lens group moves during zooming.

4. The imaging optical system of claim 3, wherein the first lens group and at least one of the following lens group move toward the object side during zooming from a wide angle end to a telephoto end.

5. The imaging optical system of claim 1, wherein a distance Df between the most object side surface of the first lens group and the most image side surface of a lens on the object side of the reflective optical element and a maximum image height Ymax satisfy at the wide angle end the following relationship:

$0.6 < Df/Y\max < 2.5$.

6. The imaging optical system of claim 1, wherein the object side lens of the second lens group is a single lens with negative power.

7. The imaging optical system of claim 6, wherein the lens with negative power is a bi-concave lens.

8. The imaging optical system of claim 1, wherein the most object side lens of the first lens group is a meniscus lens with negative power, a convex surface of which is directed toward the object side.

9. The imaging optical system of claim 1, wherein the following lens group includes:
a third lens group with positive power; and
a fourth lens group with positive power.

10. The imaging optical system of claim 1, wherein the following lens group includes:
a third lens group with positive power, wherein power $\phi 3$ of the third lens group and power $\phi W$ of a whole of the imaging optical system at a wide angle end satisfy the following relationship:

$0.35 < \phi 3/\phi W < 1.5$.

11. The imaging optical system of claim 5, wherein the following lens group includes:
a third lens group with positive power,
wherein power $\phi 3$ of the third lens group and power $\phi W$ of a whole of the imaging optical system at a wide angle end satisfy the following relationship:

$0.35 < \phi 3/\phi W < 1.5$.

12. The imaging optical system of claim 9, wherein the third lens group moves toward the object side, and the fourth lens group is stationary during zooming from a wide angle end to a telephoto end.

13. The imaging optical system of claim 1, comprising:
a collapsible lens mechanism for retracting the reflective optical element,
wherein the first lens group and a lens of the second lens group which is on the object side of the reflective optical element are moved to and housed in a space provided by retracting the reflective optical element.

14. The imaging optical system of claim 13, wherein the second lens group includes:
no more than four lenses on the image side of the reflective optical element.

15. The imaging optical system of claim 14, comprising:
more than two lenses with positive power on the image side of the reflective optical element.

16. The imaging optical system of claim 15, wherein the reflective optical element is moved toward the third lens group when retracting.

17. An image pickup apparatus, comprising:
an image pickup device for converting incident light into an electric signal; and
an imaging optical system for imaging light from an object side on the image pickup device, the imaging optical system including:
a first lens group with positive power on an object side;

a reflective optical element on an image side of the first lens group, for bending an optical axis substantially perpendicularly;

a second lens group with negative power which includes a lens on the object side of the reflective optical element and a lens on the image side of the reflective optical element; and a following lens group on the image side of the second lens group, wherein the imaging optical system is a zoom lens, and power $\phi 1$ of the first lens group and power $\phi 2$ of the second lens group satisfy the following relationship:

$-0.6 < \phi 1/\phi 2 < -0.15$.

18. The imaging optical system of claim 17, wherein at least the first lens group and the following lens group moves during zooming.

* * * * *

UNITED STATES PATENT AND TRADEMARK OFFICE
CERTIFICATE OF CORRECTION

PATENT NO.       : 7,369,326 B2                                    Page 1 of 1
APPLICATION NO.  : 11/593357
DATED            : May 6, 2008
INVENTOR(S)      : Genta Yagyu, Tetsuo Kohno and Shinji Yamaguchi It is certified that error appears in the above-identified patent and that said Letters Patent is hereby corrected as shown below:

<u>Title Page</u>:
(73) Assignee:, delete "Photot" and insert -- Photo --.

Signed and Sealed this

Nineteenth Day of August, 2008

JON W. DUDAS
*Director of the United States Patent and Trademark Office*